United States Patent [19]
Cretcher

[11] Patent Number: 5,782,391
[45] Date of Patent: Jul. 21, 1998

[54] VEHICLE ROOF RACK LOADING MECHANISM

[76] Inventor: Gary S. Cretcher, 7669 Harrisburg Hollow Rd., Bath, N.Y. 14810

[21] Appl. No.: 753,282

[22] Filed: Nov. 22, 1996

[51] Int. Cl.$^6$ ............................................. B60R 9/00
[52] U.S. Cl. ............................................. 224/310
[58] Field of Search ............................................. 224/310

[56] References Cited

U.S. PATENT DOCUMENTS

| | | | |
|---|---|---|---|
| 4,003,485 | 1/1977 | Edgerton | 224/310 X |
| 4,826,387 | 5/1989 | Audet | 224/310 X |
| 5,058,791 | 10/1991 | Henriquez et al. | 224/310 |
| 5,544,796 | 8/1996 | Dubach | 224/310 |

FOREIGN PATENT DOCUMENTS

| | | | |
|---|---|---|---|
| 101054 | 2/1984 | European Pat. Off. | 224/310 |
| 511179 | 10/1992 | European Pat. Off. | |
| 568855 | 11/1993 | European Pat. Off. | 224/310 |
| 3234597 | 3/1984 | Germany | 224/310 |

*Primary Examiner*—Renee S. Luebke

[57] ABSTRACT

A vehicle roof rack loading mechanism which allows items such as skis, cargo boxes, and the like to be easily loaded. The mechanism includes a mounting base, a guide block, and a lift member. The mechanism is fastened to the end of a roof rack cross bar and maybe retrofitted to existing rack systems. A lift member is tilted down for easy loading and is guided back onto the top of the rack for transport. A locking system is provide for securing the lift member in place. Various accessory holders may be added to the lift member for securing particular items to be carried.

7 Claims, 5 Drawing Sheets

VEHICLE ROOF RACK LOADING MECHANISM

BACKGROUND

1. Field of Invention

This invention relates to roof racks for cars and trucks, specifically to mechanisms for loading these racks with skis, cargo boxes, ladders, and other items.

2. Description of Prior Art

Currently, there are a wide variety of tubular roof racks systems which are used to carry anything from boats to lumber. These racks typically include various mounting hardware, such as cargo boxes, to secure the load to the rack. The major problem with all these racks is they are difficult to load. This loading is particularly difficult with large vehicles such as utility trucks, as it requires the person to lift an item above their head.

European Patent 0 511 179 entitled LUGGAGE-RACK FOR CARS HAVING A HIGH ROOF discloses a integrated rack and lifting rail which attempts to address the problem stated above. Shown is a lift rail that is connected to the rack with a pin mounted in transverse grooves cut into the sides of the rack cross tube. This solution greatly weakens the rack with the grooves and is not adaptable to current tubular rack systems. Additionally, the groove shown would cause a great deal of noise from air whistling through the grooves.

There exists a need for a loading mechanism that may be retrofitted to the wide variety of current rack systems and will not compromise the structural integrity of the tubular cross member of the rack.

SUMMARY OF THE INVENTION

The present invention addresses the forementioned needs for an easily adapted mechanism and easier loading of vehicle roof racks. Essentially, a guiding and pivotal adapter is provided which mounts to the end of a rack tube which guides a sliding member as it is lifted and slid onto top of the rack cross bar. This allows an item to be loaded on the side of a vehicle and pivoted into place. The loading mechanism may be added to a standard rack or built as an integrated unit, in either case the method for loading would be the same.

In a narrower aspect of the invention, various accessory holders may be attached to the sliding member for securing specialized items like cargo boxes and other items.

Additionally, the mechanism may be locked in to place with a key so that the secured load remains in its position.

DETAILED DESCRIPTION OF THE PREFERRED EMBODIMENT

Figure 1:
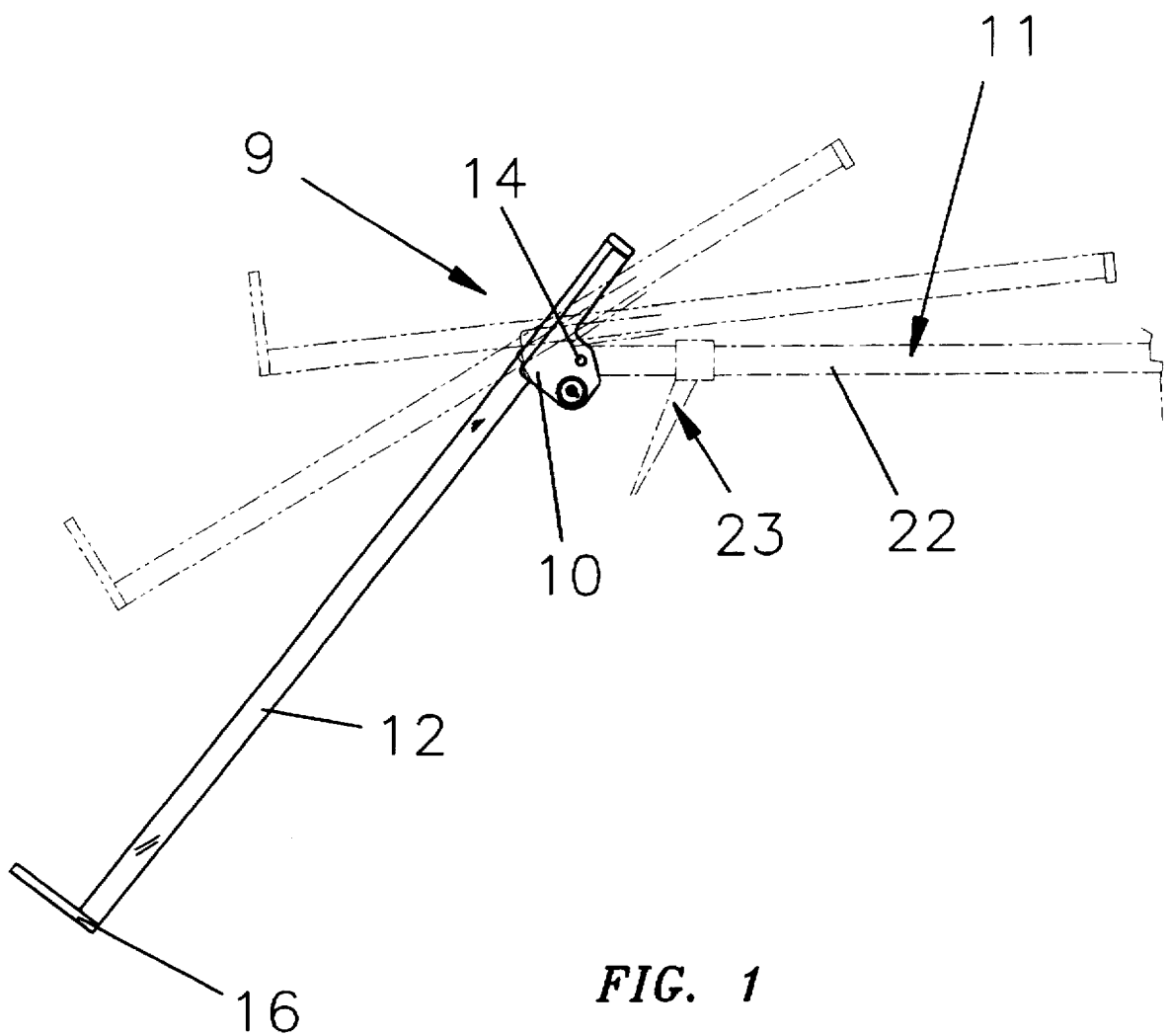
FIG. 1 is a side view of a vehicle roof rack equipped with the loading mechanism in an open position.
Figure 2:
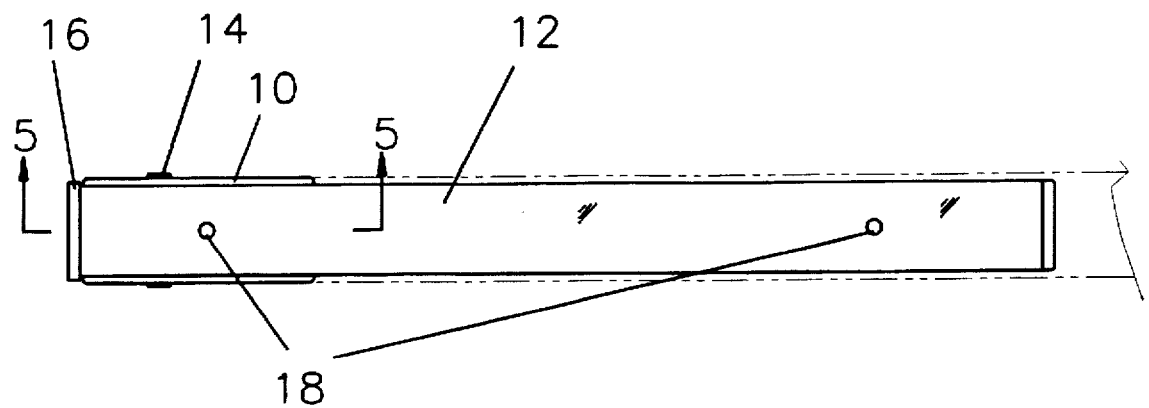
FIG. 2 is a top plan view.

A vehicle roof rack 11 including a rack loading mechanism 9 in accordance with the present invention is shown in FIG. 1. A partial view of typical roof rack 11 is illustrated including a tubular cross bar 22 and support attachment assembly 23. The invention 9 includes a mounting base 20 that is attached to the end of the cross bar 22 and secured in place by a fastener 19 best shown in FIG. 5. Generally, two or more roof racks 11 and loading mechanisms 9 would be used on a vehicle.

Figure 8:
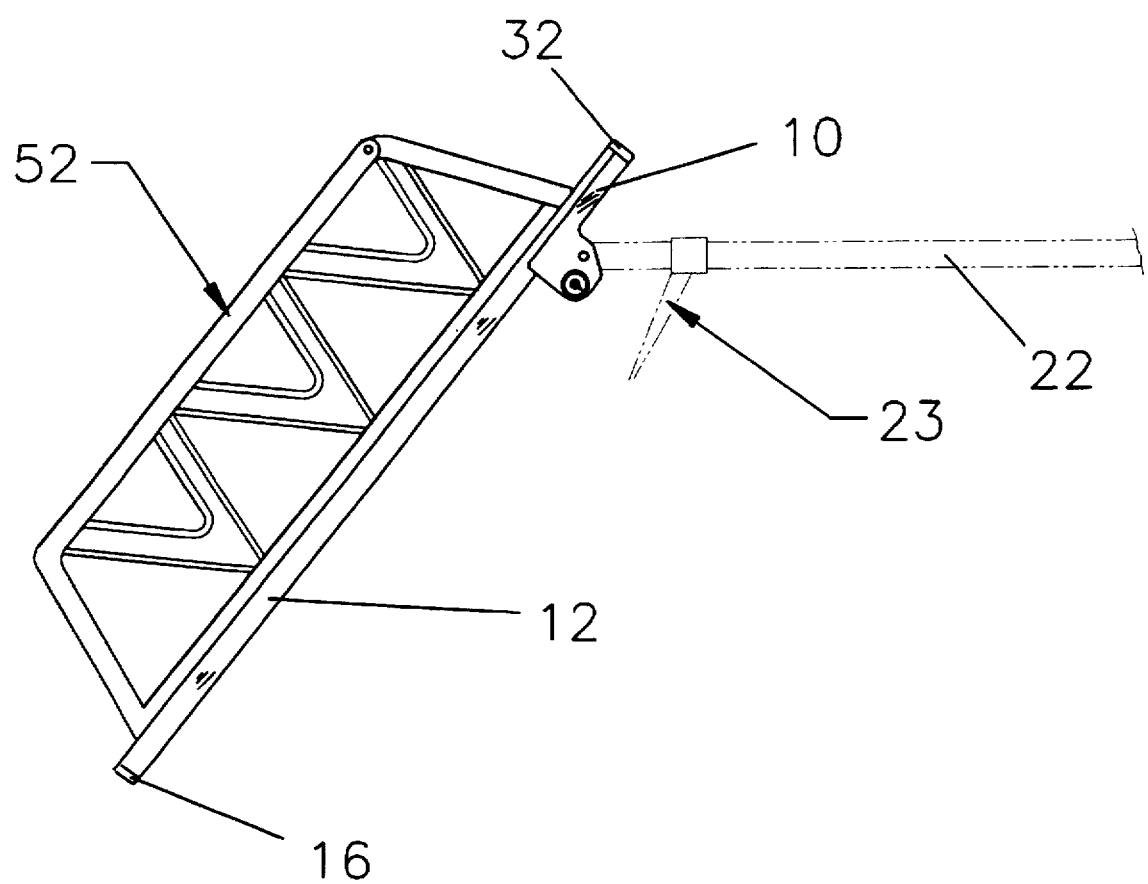
FIG. 8 is a side view with a ski holder attached.

Starting with the loading mechanism 9 in an open position as shown in FIG. 1, an item to be loaded is placed on a sliding lift member 12 and is secured in place by a suitable means. FIG. 8 shows an accessory holder 52 that could be used to help secure skis to the lift member 12. A variety of accessory holders 52 could be attached to the lift member 12 by a fastening means 18 and is not limited in any way to ski holders. The lift member 12 is slid and pivoted upward and inward onto the rack cross bar 22 with the assistance of the pivoting guide block 10, best shown in FIG. 1. Guide block 10 is connected to the mounting base 20 with a pivot pin 14. The inward sliding movement of the lift member 12 is stopped by an outer stop 16 and the outward movement is stopped by a inner stop 32 which contact the guide block 10 when the lift member 12 is in a final rest position. A lip 13, shown in FIG. 6, is included on the guide block 10 for securing the lift member 12 to the guide block 10. The downward pivot motion of guide block 10 is stopped when a guide surface 38 contacts the base surface 40, best shown in FIG. 5.

Figure 3:
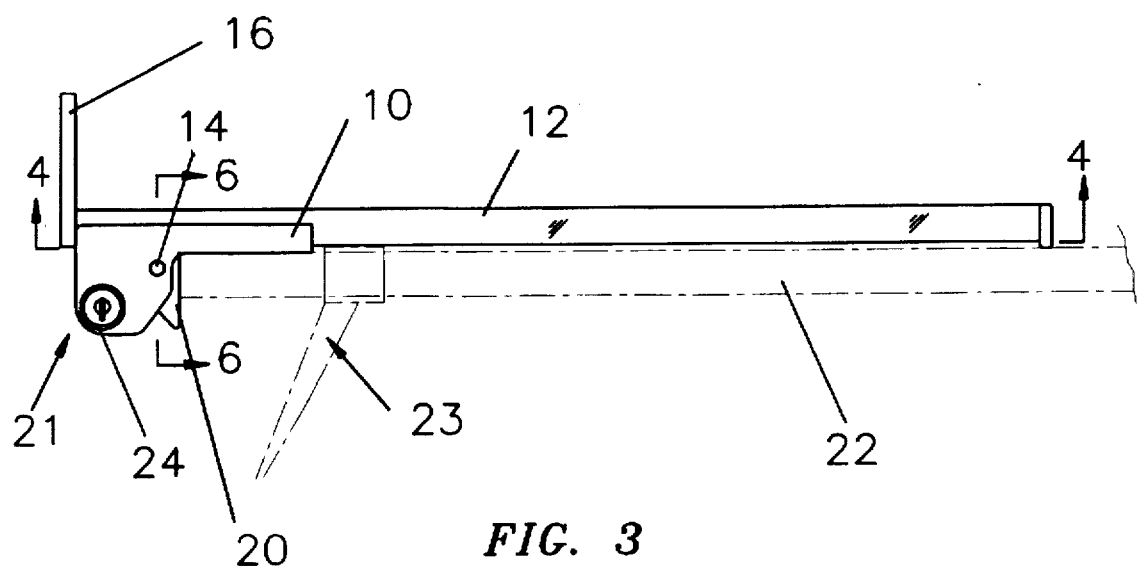
FIG. 3 is a side view of the loading mechanism in the closed position.
Figure 4:
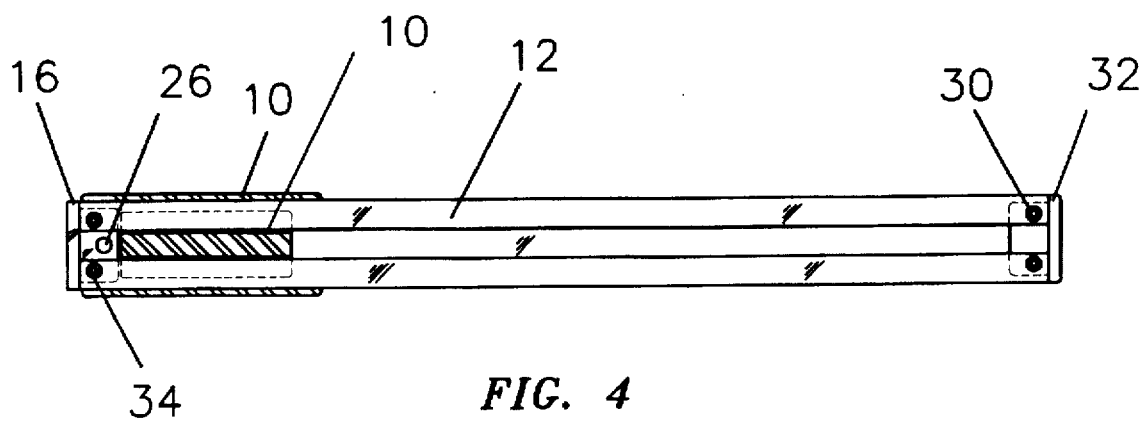
FIG. 4 is a sectional view from the line 4—4.
Figure 5:
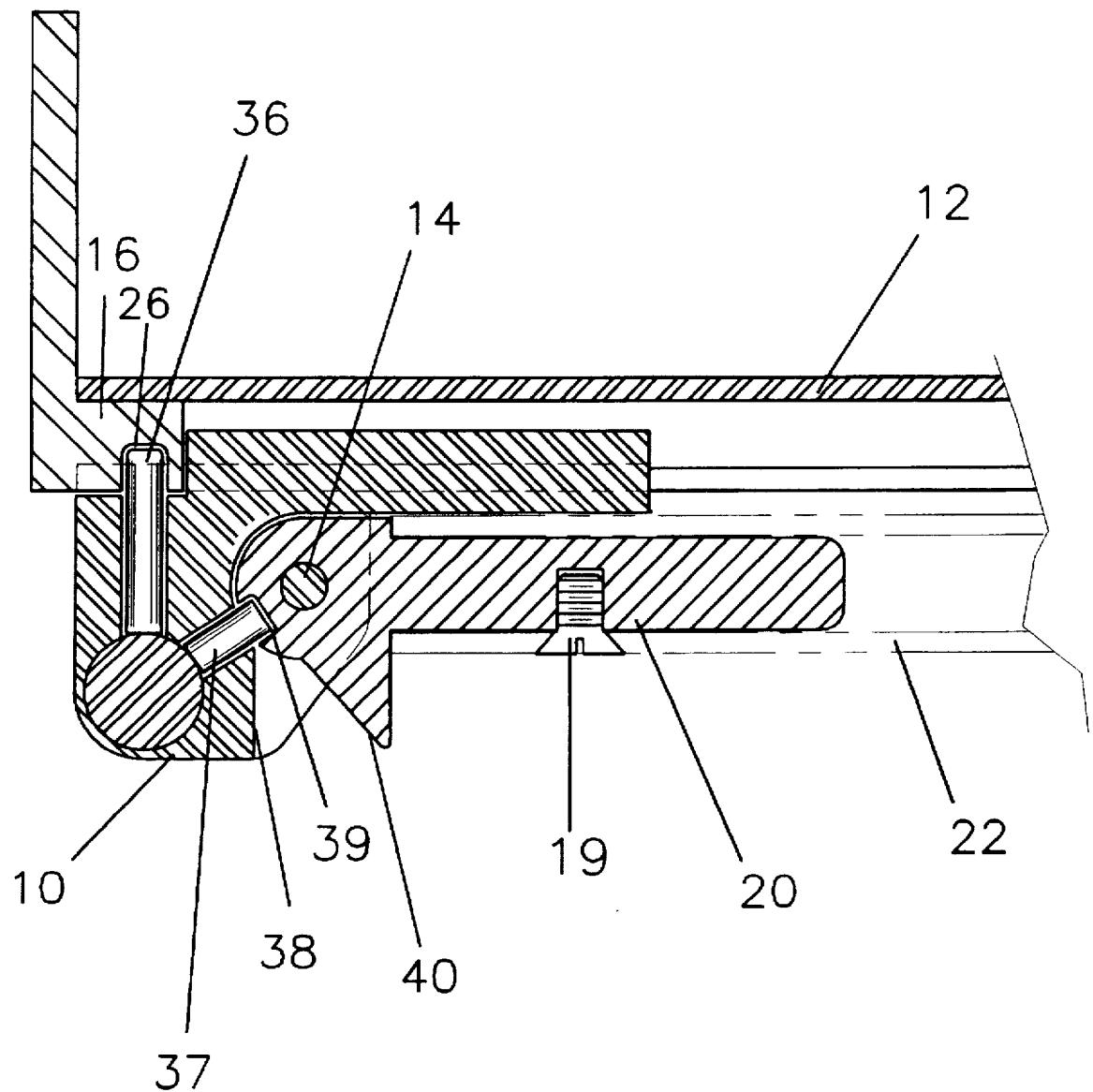
FIG. 5 is a sectional view from line 5—5.
Figure 6:
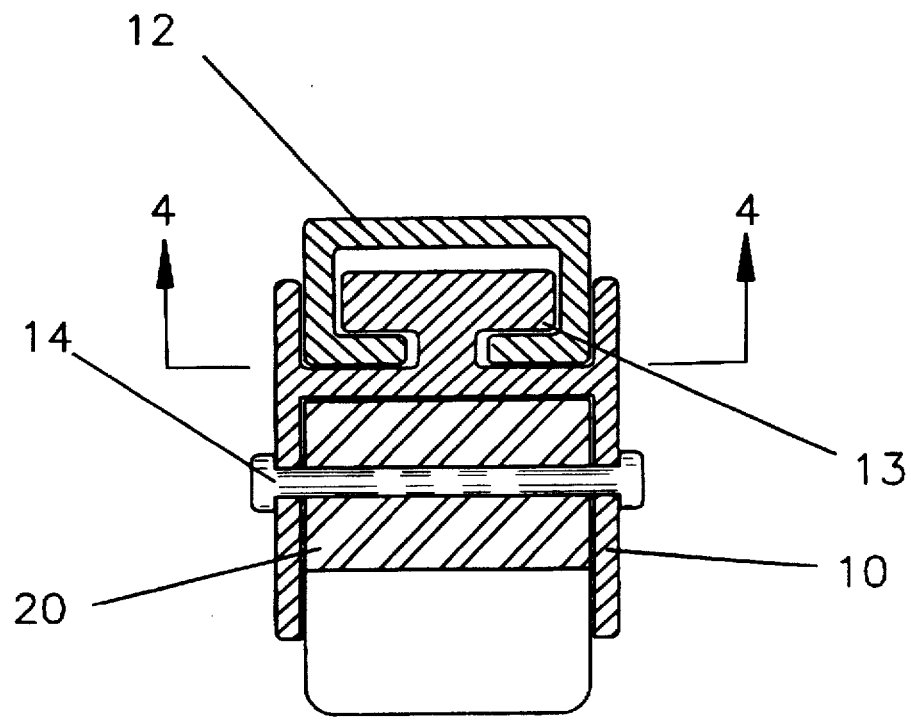
FIG. 6 is a sectional view from line 6—6.

In the horizontal or traveling position, lift member 12, shown in FIG. 3, may be locked in place by a lock means 21 comprising a lock tumbler 24, lock pin 36 and stop pin 37 shown the section in FIG. 5. Lock pin 36 is pushed into a lock pin hole 26 in the bottom of outer stop 16 by rotating lock tumbler 24 with a key. Rotating lock tumbler 24 at the same time pushes stop pin 37 to insert in recess 39 and prevents the rotation of the guide block 10 about the pivot pin 14.

Figure 7:
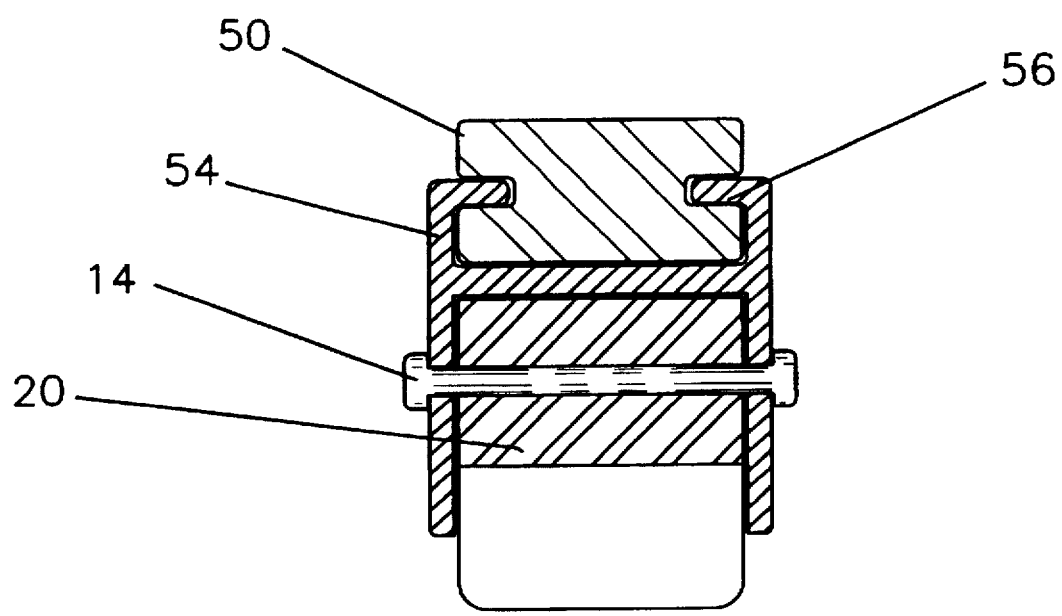
FIG. 7 is a sectional view of another embodiment from line III—III.

Cross section 6—6 shown in FIG. 6 illustrates the sliding lip 13 of the guide block 10 which secures lift member 12 to the guide block 10. The sliding lip 13 is not limited to the cross section shown in FIG. 6. FIG. 7 shows another embodiment in which lift member 12 is replaced with an alternative lift member 50 having a solid H shaped cross section and guide block 10 is replaced with an alternative guide block 54. The alternative lift member 50 is secured to guide block 54 by a lip 56.

It is to be understood that the invention is not limited to the exact construction illustrated and described above, but that various changes and modifications may be made without departing from the spirit and scope of the invention as defined in the following claims.

What is claimed is:

1. A vehicle roof rack loading mechanism comprising:

a pivotal guide block having a pivot portion and guide portion;

a lift member;

slidable guide means connecting said lift member and said guide block to permit an outward or inward movement of the said lift member;

a mounting base;

pivot means connecting said guide block and said base to permit pivoting movement of said guide block and said lift member; wherein said lift member may be slid outward and tilted downward and for loading and pivoted up and slid in for transport.

2. A loading mechanism as defined by claim 1 wherein:
said guide block includes a locking means to prevent the pivoting of said guide block and the sliding of said lift member.

3. A loading mechanism as defined by claim 2 wherein:
said guide block includes a surface that contacts said base to limit the rotation of said guide block about the pivot.

4. A loading mechanism as defined in claim 1 wherein:
said guide block includes a slidable lip which securely holds said lift member to said guide block.

5. A loading mechanism as defined by claim 1 wherein:
said lift member includes outer and inner stops to prevent the removal of said lift member from said guide block.

6. A loading mechanism as defined by claim 1 wherein:
said lift member includes a fastening means for connecting an accessory holder to said lift member.

7. A loading mechanism as defined by claim 1 wherein:
said pivot means is a pivot pin.

* * * * *